United States Patent
Chen et al.

(10) Patent No.: US 10,762,164 B2
(45) Date of Patent: Sep. 1, 2020

(54) VECTOR AND MATRIX COMPUTING DEVICE

(71) Applicant: Cambricon Technologies Corporation Limited, Beijing (CN)

(72) Inventors: Tianshi Chen, Beijing (CN); Xiao Zhang, Beijing (CN); Shaoli Liu, Beijing (CN); Yunji Chen, Beijing (CN)

(73) Assignee: Cambricon Technologies Corporation Limited, Beijing (CN)

( * ) Notice: Subject to any disclaimer, the term of this patent is extended or adjusted under 35 U.S.C. 154(b) by 50 days.

(21) Appl. No.: 16/039,803

(22) Filed: Jul. 19, 2018

(65) Prior Publication Data

US 2018/0329868 A1 Nov. 15, 2018

Related U.S. Application Data

(63) Continuation-in-part of application No. PCT/CN2016/078550, filed on Apr. 6, 2016, and a
(Continued)

(30) Foreign Application Priority Data

Jan. 20, 2016 (CN) .......................... 2016 1 0037535
Jan. 20, 2016 (CN) .......................... 2016 1 0039216

(51) Int. Cl.
*G06F 17/16* (2006.01)
*G06F 7/487* (2006.01)
(Continued)

(52) U.S. Cl.
CPC ............ *G06F 17/16* (2013.01); *G06F 7/4873* (2013.01); *G06F 7/4876* (2013.01); *G06F 9/30036* (2013.01); *G06N 20/00* (2019.01)

(58) Field of Classification Search
CPC ........................................................ G06F 17/16
(Continued)

(56) References Cited

U.S. PATENT DOCUMENTS 4,541,046 A   9/1985  Hachioji et al.
4,888,679 A   12/1989 Fossum et al.
(Continued)

FOREIGN PATENT DOCUMENTS

CN      102043723 A    5/2011
CN      CN102521535 A  6/2012
(Continued)

OTHER PUBLICATIONS

Machine translation of CN 103699360 (A). (Year: 2014).*
(Continued)

*Primary Examiner* — Tan V Mai
(74) *Attorney, Agent, or Firm* — Getech Law LLC; Jun Ye

(57) ABSTRACT

A computing device and related products are provided. The computing device is configured to perform machine learning calculations. The computing device includes an operation unit, a controller unit, and a storage unit. The storage unit includes a data input/output (I/O) unit, a register, and a cache. Technical solution provided by the present disclosure has advantages of fast calculation speed and energy saving.

19 Claims, 4 Drawing Sheets

Related U.S. Application Data continuation-in-part of application No. PCT/CN2016/078546, filed on Apr. 6, 2016.

(51) Int. Cl.
*G06F 9/30* (2018.01)
*G06N 20/00* (2019.01)

(58) Field of Classification Search
USPC .......................................................... 708/520
See application file for complete search history.

(56) References Cited

U.S. PATENT DOCUMENTS

| | | | |
|---|---|---|---|
| 5,689,653 | A | 11/1997 | Karp et al. |
| 2004/0103262 | A1 | 5/2004 | Glossner et al. |
| 2014/0244967 | A1 | 8/2014 | Ingle et al. |

FOREIGN PATENT DOCUMENTS

| | | |
|---|---|---|
| CN | 102750127 A | 10/2012 |
| CN | 103699360 A | 4/2014 |
| CN | 104699458 A | 6/2015 |

OTHER PUBLICATIONS

T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X" an Accelerator for Sparse Neural Networks, the 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS 14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.
CN Application No. 201610039216.8, Office Action dated Sep. 6, 2018, 10 pages.
PCT/CN2016/078546—International Search Report, dated Oct. 18, 2016, 9 pages. (no English translation).
PCT/CN2016/078550—International Search Report, dated Aug. 15, 2016, 9 pages. (no English translation).
201610039216.8—Office Action, dated Apr. 26, 2019, 26 pages. (no English translation).
PCT/CN2016/078546—16885911.4—Supplementary European Search Report, dated Aug. 13, 2019, 1 page.
Chou, et al., VEGAS: "Soft Vector Processor with Scratchpad Memory", FPGA '11, Feb. 27-Mar. 1, 2011, 10 pages.
Liu, et al., "Accelerator Compiler for the Venice Vector Processor", FPGA '12, Feb. 22-24, 2012, 4 pages.
PCT/CN2016/078546—16885911.4—Extended European Search Report, dated Jul. 25, 2019, 10 page.
Seyerance, et al., "VENICE: A Compact Vector Processor for FPGA Application", 2012, 8 pages.
201710907069.6—Office Action, dated Sep. 18, 2019, 8 pages.
Chapter IV Two-Dimensional Graphics Transformation, Jul. 30, 2012, translated in English, 21 pages.
Application No. KR10-0289746, Office Action dated May 22, 2019, pp. 125. (with translations).
EP16885912.2—European Search Report dated Apr. 1, 2020, 4 pages.
CN201610039216.8—Official Action (3) dated Sep. 25, 2019, 9 pages.
Application No. 201710907069.6—Office Action dated Dec. 9, 2019, 7 pages.
EP16885911.A—Official Action dated Mar. 3, 2020, 9 pages.
KR20197017258.A—Official Action dated Mar. 3, 2020, 4 pages.
KR20187015436.A—Written Opinion dated May 9, 2019, 8 pages.
EP 16885912.2; European Search Report dated Jun. 9, 2020; 8 pages.

\* cited by examiner

VECTOR AND MATRIX COMPUTING DEVICE

TECHNICAL FIELD

This disclosure relates to the field of information processing technology, and more particularly to a computing device and related products.

BACKGROUND

With the development of information technology and the ever-growing demand of people, people are increasingly demanding timeliness of information. Currently, a terminal acquires and processes information based on general-purpose processors.

In practice, a manner in which a general-purpose processor runs a software program to process information is limited by an operating speed of the general-purpose processor. Especially, in the case of the general-purpose processor with large load, efficiency of information processing is low, and delay is large as well. For a computational model of information processing such as a matrix operation neural network model, computational effort is larger, and therefore the general-purpose processor takes a long time to complete a matrix operation, which is inefficient.

SUMMARY

Embodiments of the present disclosure provide a computing device and related products, which can improve processing speed and efficiency of a matrix operation.

According to a first aspect of the present disclosure, a computing device is provided. The computing device is configured to perform machine learning calculations, and includes an operation unit, a controller unit, and a storage unit. The storage unit includes a data input/output (I/O) unit, and one or any combination of a register and a cache, where the data I/O unit is configured to acquire data, a machine learning model, and calculation instructions, and the storage unit is configured to store the machine learning model, input data, and weight data.

The controller unit is configured to extract a first calculation instruction from the storage unit, to obtain an operation code and an operation field of the first calculation instruction by parsing the first calculation instruction, to extract input data and weight data corresponding to the operation field, and to send the operation code as well as the input data and the weight data corresponding to the operation field to the operation unit, where the operation code is an operation code of a matrix calculation instruction.

The operation unit is configured to obtain a result of the first calculation instruction by performing an operation corresponding to the operation code on the input data and the weight data corresponding to the operation field, according to the operation code.

According to a second aspect of the present disclosure, a machine learning operation device is provided. The machine learning operation device includes at least one computing device of the first aspect. The machine learning operation device is configured to acquire data to be operated and control information from other processing devices, to perform a specified machine learning operation, and to send a result of performing the specified machine learning operation to other processing devices through an input/output (I/O) interface.

At least two computing devices are configured to connect with each other and to transmit data through a specific structure when the machine learning operation device includes the at least two computing devices.

The at least two computing devices are configured to interconnect with each other and to transmit data via a fast peripheral component interconnect express (PCIE) bus to support larger-scale machine learning operations. The at least two computing devices share a same control system or have their own control systems, share a memory or have their own memories, and have an interconnection mode of an arbitrary interconnection topology.

According to a third aspect of the present disclosure, a combined processing device is provided. The combined processing device includes the machine learning operation device of the second aspect, a universal interconnect interface, and other processing devices. The machine learning operation device is configured to interact with other processing devices to complete a user-specified operation. The combined processing device further includes a storage device. The storage device is connected with the machine learning operation device and other processing devices, and configured to store data of the machine learning operation device and other processing devices.

According to a fourth aspect of the present disclosure, a chip is provided. The chip includes any one of the machine learning operation device of the first aspect, the combined processing device of the second aspect, and the combined processing device of the third aspect.

According to a fifth aspect of the present disclosure, a chip packaging structure is provided. The chip packaging structure includes the chip of the fourth aspect.

According to a sixth aspect of the present disclosure, a board is provided. The board includes the chip packaging structure of the fifth aspect.

According to a seventh aspect of the present disclosure, an electronic equipment is provided. The electronic equipment includes the chip of the fourth aspect or the board of the sixth aspect.

In some implementations, the electronic equipment can be a data processing device, a robot, a computer, a printer, a scanner, a tablet, a smart terminal, a mobile phone, a driving recorder, a navigator, a sensor, a webcam, a server, a cloud server, a camera, a video camera, a projector, a watch, headphones, mobile storage, a wearable device, a vehicle, a home appliance, and/or a medical equipment.

In some implementations, the vehicle includes, but is not limited to, an airplane, a ship, and/or a car. The home appliance includes, but is not limited to, a television (TV), an air conditioner, a microwave oven, a refrigerator, an electric cooker, a humidifier, a washing machine, an electric lamp, a gas stove, and a hood. The medical equipment includes, but is not limited to, a nuclear magnetic resonance spectrometer, a B-ultrasonic, and/or an electrocardiograph.

According to the computing device provided by embodiments of the present disclosure, the operation code and the operation field are obtained by parsing the calculation instruction, the input data and the weight data corresponding to the operation field are extracted, and then the operation code as well as the input data and the weight data corresponding to the operation field are sent to the operation unit to perform an operation to obtain a calculation result, which can improve calculation efficiency.

BRIEF DESCRIPTION OF THE DRAWINGS

To illustrate technical solutions embodied by the embodiments of the present disclosure more clearly, the following briefly introduces the accompanying drawings required for describing the embodiments. Apparently, the accompanying drawings in the following description merely illustrate some embodiments of the present disclosure. Those of ordinary skill in the art may also obtain other drawings based on these accompanying drawings without creative efforts.

DETAILED DESCRIPTION

Hereinafter, technical solutions embodied by the embodiments of the disclosure will be described in a clear and comprehensive manner in reference to the accompanying drawings intended for the embodiments. It is evident that the embodiments described herein constitute merely some rather than all of the embodiments of the disclosure, and that those of ordinary skill in the art will be able to derive other embodiments based on these embodiments without creative efforts, which all such derived embodiments shall all fall in the protection scope of the disclosure.

The terms "first", "second", "third", and "fourth" used in the specification, the claims, and the accompany drawings of the present disclosure are used for distinguishing different objects rather than describing a particular order. The terms "include", "comprise", and "have" as well as variations thereof are intended to cover non-exclusive inclusion. For example, a process, method, system, product, or apparatus including a series of steps or units is not limited to the listed steps or units, it can optionally include other steps or units that are not listed; alternatively, other steps or units inherent to the process, method, product, or device can be included either.

The term "embodiment" or "implementation" referred to herein means that a particular feature, structure, or feature described in connection with the embodiment may be contained in at least one embodiment of the present disclosure. The phrase appearing in various places in the specification does not necessarily refer to the same embodiment, nor does it refer an independent or alternative embodiment that is mutually exclusive with other embodiments. It is expressly and implicitly understood by those skilled in the art that an embodiment described herein may be combined with other embodiments.

Figure 1A:
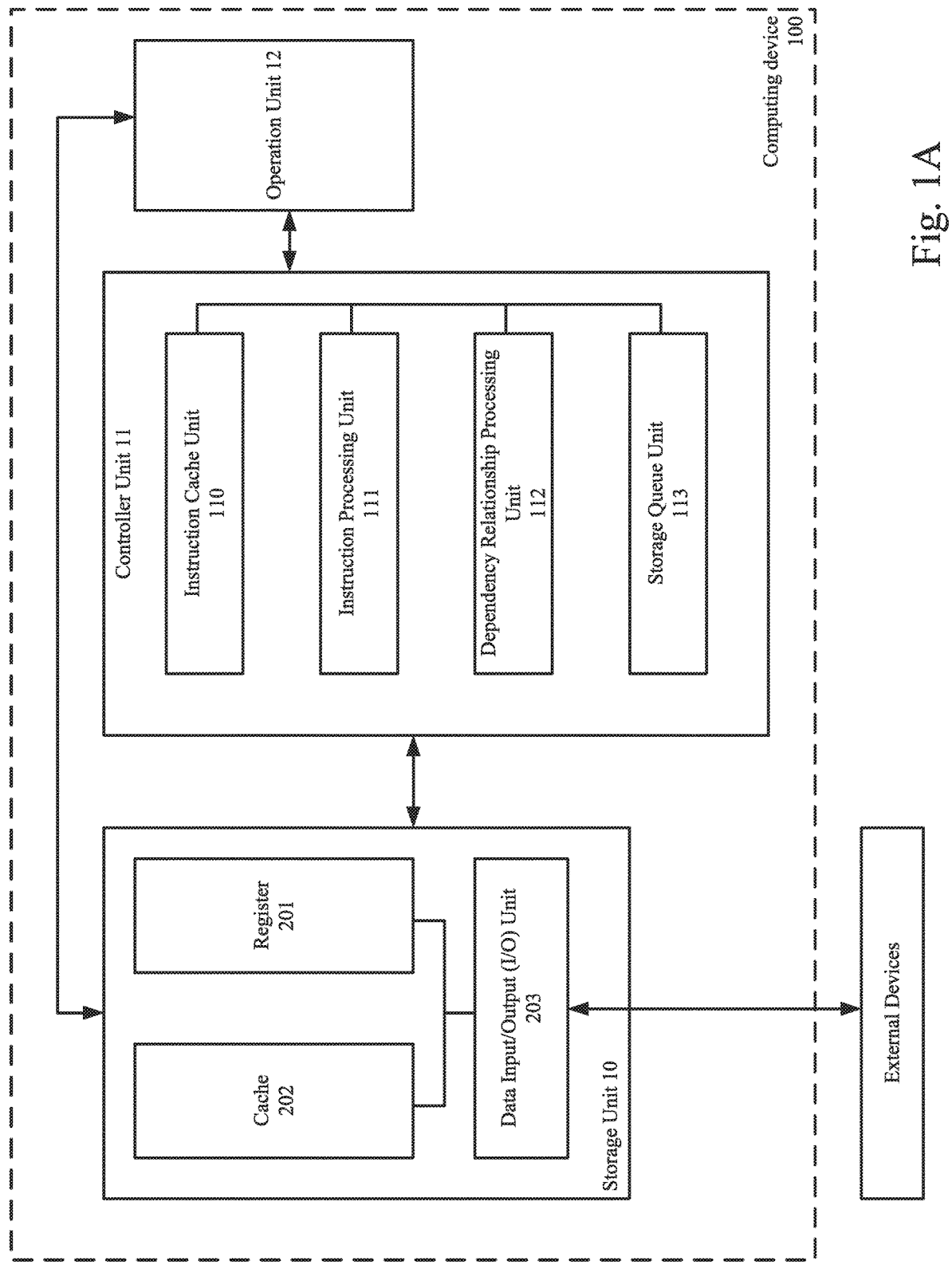
FIG. 1A is a schematic structural diagram illustrating a computing device according to an embodiment of the present disclosure.

As illustrated in FIG. 1A, a computing device is provided. The computing device may include a storage unit 10, a controller unit 11, and an operation unit 12. The controller unit 11 may be coupled with the storage unit 10 and the operation unit 12 respectively.

The storage unit 10 may include a data input/output (I/O) unit 203. The data I/O unit 203 may be configured to acquire data, a machine learning model, and calculation instructions. For example, when the machine learning model is an artificial neural network model, the acquired data may include, but is not limited to input data, weight data, and output data.

The controller unit 11 may be configured to extract a first calculation instruction from the storage unit 10, to obtain an operation code and an operation field of the first calculation instruction by parsing the first calculation instruction, to extract input data and weight data corresponding to the operation field, and to send the operation code as well as the input data and the weight data corresponding to the operation field to the operation unit 12. In an example, the operation code may be an operation code of a matrix calculation instruction.

The operation unit 12 may be configured to obtain a result of the first calculation instruction by performing an operation corresponding to the operation code on the input data and the weight data corresponding to the operation field, according to the operation code.

As one example, the controller unit 11 includes an instruction cache unit 110, an instruction processing unit 111, and a storage queue unit 113.

The instruction cache unit 110 may be configured to cache the first calculation instruction.

The instruction processing unit 111 may be configured to obtain the operation code and the operation field of the first calculation instruction by parsing the first calculation instruction.

The storage queue unit 113 may be configured to store an instruction queue, where the instruction queue may include a plurality of calculation instructions or operation codes to be executed arranged in a sequence of the instruction queue.

Taking the calculation instruction as an example, a structure of the calculation instruction can be illustrated as follows.

| operation code | register or immediate data | register or immediate data | ... |
|---|---|---|---|

In the above table, an ellipsis indicates that multiple registers or immediate data can be included.

In a nonlimiting example, the calculation instruction can be a COMPUTE instruction, but the structure of the calculation instruction may include but not be limited to a structure of the COMPUTE instruction. In one implementation, the calculation instruction may contain one or more operation fields and one operation code. The calculation instruction can also be a neural network operation instruction. Taking the neural network operation instruction as an example, register number 0, register number 1, register number 2, register number 3, and register number 4 illustrated in Table 1 can be used as operation fields. Each the register number 0, the register number 1, the register number 2, the register number 3, and the register number 4 may be number of one or more registers.

TABLE 1

| operation code | register number 0 | register number 1 | register number 2 | register number 3 | register number 4 |
|---|---|---|---|---|---|
| COMPUTE | start address of input data | length of input data | start address of weight | length of weight | address of interpolation |

TABLE 1-continued

| operation code | register number 0 | register number 1 | register number 2 | register number 3 | register number 4 |
|---|---|---|---|---|---|
| | | | | | table of activation function |
| IO | external memory address of data | length of data | internal memory address of data | | |
| NOP | | | | | |
| JUMP | target address | | | | |
| MOVE | input address | size of data | output address | | |

Figure 1B:
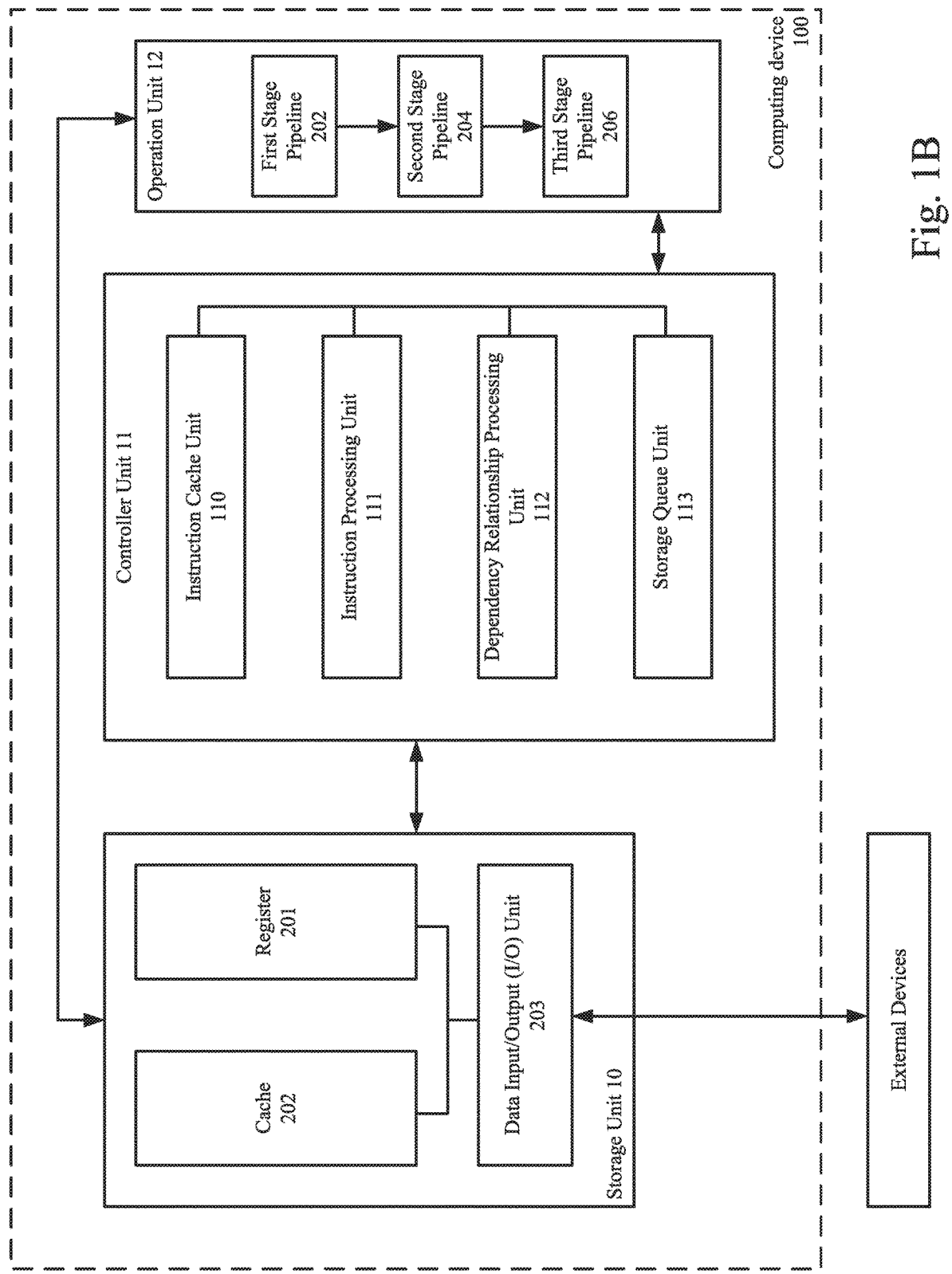
FIG. 1B is a structural diagram illustrating a computing device according to another embodiment of the present disclosure.

As one implementation, the storage unit 10 may further include one or any combination of a register 201 and a cache 202. For example, as illustrated in FIG. 1A or FIG. 1B, the storage unit 10 includes the register 201 and the cache 202. In an implementation, the register 201 can be a scalar register, and the cache 202 can be a scratch cache.

In another implementation, the register 201 can be an off-chip memory. In practice, the register 201 can also be an on-chip memory configured to store a data block. The data block can be n-dimensional data, where n is an integer greater than or equal to 1. For instance, when n=1, the data block is 1-dimensional data (i.e., a vector); when n=2, the data block is 2-dimensional data (i.e., a matrix); when n≥3, the data block is a multidimensional tensor. The storage unit 10 can include one or any combination of a register and a cache. The cache can be the storage unit 10, e.g., a scratchpad memory included in the storage unit 10. Taking matrix data as an example of 2-dimensional data for illustration, a storage form of the 2-dimensional data of a memory may include, but is not limited to, a form in which rows of the matrix data may be stored in a storage unit after columns of the matrix data are stored in the storage unit. In practice, the storage form of the 2-dimensional data of the memory can also be a form in which columns of the matrix data may be stored in the storage unit after rows of the matrix data are stored in the storage unit.

As one implementation, the controller unit 11 further may include a dependency relationship processing unit 112.

The dependency relationship processing unit 112 may be configured to: determine whether there is an associated relationship between the first calculation instruction and a zeroth calculation instruction prior to the first calculation instruction, when multiple calculation instructions are to be executed; cache the first calculation instruction to the instruction cache unit 110 based on a determination that there is the associated relationship between the first calculation instruction and the zeroth calculation instruction; transmit the first calculation instruction extracted from the instruction cache unit 110 to the operation unit 12 after execution of the zeroth calculation instruction is completed.

The dependency relationship processing unit 112 configured to determine whether there is the associated relationship between the first calculation instruction and the zeroth calculation instruction prior to the first calculation instruction may be configured to: extract a first storage address space of the operation field of the first calculation instruction, according to the first calculation instruction; extract a zeroth storage address space of an operation field of the zeroth calculation instruction, according to the zeroth calculation instruction; determine there is the associated relationship between the first calculation instruction and the zeroth calculation instruction when there is an overlapping area of the first storage address space and the zeroth storage address space, or determine there is no associated relationship between the first calculation instruction and the zeroth calculation instruction when there is no overlapping area of the first storage address space and the zeroth storage address space.

In an implementation, the operation unit 12 illustrated in FIG. 1B can include a plurality of operation modules. The plurality of operation modules are configured to form a structure of n-stage pipeline and to perform calculations of the n-stage pipeline.

As one implementation, the operation unit 12 is configured to: obtain a first result by performing a calculation of a first stage pipeline 202 on the input data and the weight data; obtain a second result by performing a calculation of a second stage pipeline 204 on the first result input in the second stage pipeline 204; obtain a third result by performing a calculation of a third stage pipeline 206 on the second result input in the third stage pipeline 206; in a manner described earlier, calculation is performed step by step; obtain a nth result by performing a calculation of a nth stage pipeline on a $(n-1)^{th}$ result input in the nth stage pipeline; input the nth result to the storage unit 10, where n is an integer greater than or equal to 2.

As an example, the operation unit 12 is configured to perform a neural network calculation.

In an implementation, the operation unit 12 includes, but is not limited to, one or more multipliers of a first stage pipeline 202, one or more adders of a second stage pipeline 204 (e.g., the adders of the second stage pipeline 204 can form an adder tree), an activation function unit of a third stage pipeline 206, and/or a vector processing unit of a fourth stage pipeline. As one implementation, the vector processing unit of the fourth stage pipeline can perform a vector operation and/or a pooling operation. The first stage pipeline 202 is configured to obtain an output (hereinafter, an out) through multiplying input data 1 (hereinafter, an in1) by input data 2 (hereinafter, an in2), where the in1 can be input data, the in2 can be weight data, that is, the process performed by the first stage pipeline 202 can be expressed as out=in1*in2. The second stage pipeline 204 is configured to obtain output data (hereinafter, also recorded as an out) by adding input data (hereinafter, also recorded as an in1) through an adder. For example, when the second stage pipeline 204 is the adder tree, output data is obtained by adding the in1 step by step through the adder tree, where the in1 is a vector having a length of N and N is greater than 1, that is, the process performed by the second stage pipeline 204 can be expressed as out=in1[1]+in1[2]+ . . . +in1[N]; and/or output data is obtained by adding a result of accumulation of the in1 through the adder tree to input data (hereinafter, also recorded as an in2), that is, the process performed by the second stage pipeline 204 can be expressed as out=in1[1]+in1[2]+ . . . +in1[N]+in2; or output data is obtained by adding the in1 to the in2, that is, the process performed by the second stage pipeline 204 can be expressed as out=in1+in2. The third stage pipeline 206 is configured to obtain active output data (hereinafter, also recorded as an out) by performing an activation function operation (hereinafter, an active) on input data (hereinafter, an in), that is, the process performed by the third stage pipeline 206 can be expressed as out=active(in), where the active can be a sigmoid, a tan h, a relu, a softmax, or the like. In addition to an activation operation, the third stage pipeline 206 can perform other nonlinear functions, and obtain output data (hereinafter, also recorded as an out) by performing an operation (hereinafter, a f) on input data (hereinafter, also recorded as an in), that is, the process performed by the third stage pipeline 206 can be expressed as out=f(in). The vector processing unit of the fourth stage pipeline is configured to obtain output data (hereinafter, also recorded as an out) by performing a pooling operation (hereinafter, a pool) on input data (hereinafter, also recorded as an in), that is, the process performed by the fourth stage pipeline can be expressed as out=pool(in), where the pool represents a pooling operation, which includes, but is not limited to, a mean-pooling, a max-pooling, and a median pooling, and the in is data of a pooled core related to the out.

The operation unit 12 is configured to perform the following operation. In a first part of the operation, the operation unit 12 is configured to obtain multiplied data through multiplying the input data 1 by the input data 2; and/or in a second part of the operation, the operation unit 12 is configured to perform an addition operation (e.g., an operation of an adder tree, the input data 1 is added step by step through the adder tree), or to obtain output data by adding the input data 1 to the input data 2; and/or in a third part of the operation, the operation unit 12 is configured to perform an activation function (hereinafter, an active) operation, and to obtain output data by performing the activation function operation on input data; and/or in a fourth part of the operation, the operation unit 12 is configured to perform a pooling operation (hereinafter, a pool), that is, out=pool(in), where the pool represents a pooling operation, the pooling operation includes, but is not limited to, a mean-pooling, a max-pooling, and a median pooling. The input data (hereinafter, in) is data of a pooled core related to the output data (hereinafter, out). The operations of the above parts can be freely selected by combining multiple parts in different sequences to achieve various functional operations. Accordingly, computing units can form a structure of two-stage pipeline, a structure of three-stage pipeline, a structure of four-stage pipeline, or the like.

As one implementation, the calculation instruction mentioned above can be a vector instruction. The calculation instruction includes, but is not limited to, a vector addition instruction (VA), a vector-add-scalar instruction (VAS), a vector subtraction instruction (VS), a scalar-subtract-vector instruction (SSV), a vector-multiply-vector instruction (VMV), a vector-multiply-scalar instruction (VMS), a vector division instruction (VD), a scalar-divide-vector instruction (SDV), a vector AND vector instruction (VAV), a vector AND instruction (VAND), a vector OR vector instruction (VOV), a vector OR instruction (VOR), a vector exponent instruction (VE), a vector logarithm instruction (VL), a vector greater than instruction (VGT), a vector equal decision instruction (VEQ), a vector invert instruction (VINV), a vector merge instruction (VMER), a vector maximum instruction (VMAX), a scalar to vector instruction (STV), a scalar to vector Pos N instruction (STVPN), a vector Pos N to scalar instruction (VPNTS), a vector retrieval instruction (VR), a vector dot product instruction (VP), a random vector instruction (RV), a vector cyclic shift instruction (VCS), a vector load instruction (VLOAD), a vector storage instruction (VS), a vector movement instruction (VMOVE), a matrix-multiply-vector instruction (MMV), a vector-multiply-matrix instruction (VMM), a matrix-multiply-scalar instruction (VMS), a tensor operation instruction (TENS), a matrix addition instruction (MA), a matrix subtraction instruction (MS), a matrix retrieval instruction (MR), a matrix load instruction (ML), a matrix storage instruction (MS), and a matrix movement instruction (MMOVE).

For the vector addition instruction (VA), a device is configured to respectively retrieve two blocks of vector data of a specified size from specified addresses of the storage unit 10, e.g., a scratchpad memory included in the storage unit 10. Then an addition operation is performed on the two blocks of vector data in the operation unit 12, e.g., a vector operation unit included in the operation unit 12. Finally, a result of the addition operation may be written back into a specified address of the storage unit 10 or the scratchpad memory.

For the vector-add-scalar instruction (VAS), a device is configured to retrieve vector data of a specified size from a specified address of the storage unit 10, e.g., a scratchpad memory included in the storage unit 10 and scalar data from a specified address of a scalar register file. Then, in the storage unit 10, e.g., a scalar operation unit in the storage unit 10, a value of a scalar is added to each element of a vector. Finally, a result is written back into a specified address of the scratchpad memory.

For the vector subtraction instruction (VS), a device is configured to respectively retrieve two blocks of vector data of a specified size from specified addresses of the storage unit 10, e.g., a scratchpad memory included in the storage unit 10. Then a subtraction operation is performed on the two blocks of vector data in a vector operation unit. Finally, a result is written back into a specified address of the scratchpad memory.

For the scalar-subtract-vector instruction (SSV), a device is configured to retrieve scalar data from a specified address of a scalar register file and vector data from a specified address of the storage unit 10, e.g., a scratchpad memory included in the storage unit 10. Then, in a vector calculation unit, subtract corresponding elements of a vector with a scalar. Finally, a result is written back into a specified address of the scratchpad memory.

For the vector-multiply-vector instruction (VMV), a device is configured to respectively retrieve two blocks of vector data of a specified size from specified addresses of the storage unit 10, e.g., a scratchpad memory included in the storage unit 10. Then, in a vector calculation unit, a contrapuntal multiplication operation is performed on the two blocks of vector data. Finally, a result is written back into a specified address of the scratchpad memory.

For the vector-multiply-scalar instruction (VMS), a device is configured to retrieve vector data of a specified size from a specified address of the storage unit 10, e.g., a scratchpad memory included in the storage unit 10 and scalar data of a specified size from a specified address of a scalar register file. Then a vector-multiply-scalar operation is performed (that is, a vector is multiplied by a scalar) in the operation unit 12, e.g., a vector operation unit included in the operation unit 12. Finally, a result is written back into a specified address of the scratchpad memory.

For the vector division instruction (VD), a device is configured to respectively retrieve two blocks of vector data of a specified size from specified addresses of the storage unit 10, e.g., a scratchpad memory included in the storage unit 10. Then, in a vector operation unit, a contrapuntal division operation is performed on the two blocks of vector data. Finally, a result is written back into a specified address of the scratchpad memory.

For the scalar-divide-vector instruction (SDV), a device is configured to retrieve scalar data from a specified address of a scalar register file and vector data of a specified size from a specified address of the storage unit 10, e.g., a scratchpad memory included in the storage unit 10. Then, in a vector calculation unit, divide a scalar by corresponding elements of a vector. Finally, a result is written back into a specified address of the scratchpad memory.

For the vector AND vector instruction (VAV), a device is configured to respectively retrieve two blocks of vector data of a specified size from specified addresses of the storage unit 10, e.g., a scratchpad memory included in the storage unit 10. Then, in a vector operation unit, a contrapuntal AND operation is performed on two vectors. Finally, a result is written back into a specified address of the scratchpad memory.

For the vector AND instruction (VAND), a device is configured to retrieve vector data of a specified size from a specified address of the storage unit 10, e.g., a scratchpad memory included in the storage unit 10. Then, in a vector operation unit, an AND operation is performed on each element of a vector. Finally, a result is written back into a specified address of a scalar register file.

For the vector OR vector instruction (VOV), a device is configured to respectively retrieve two blocks of vector data of a specified size from specified addresses of the storage unit 10, e.g., a scratchpad memory included in the storage unit 10. Then, in a vector operation unit, a contrapuntal OR operation is performed on two vectors. Finally, a result is written back into a specified address of the scratchpad memory.

For the vector OR instruction (VOR), a device is configured to retrieve vector data of a specified size from a specified address of the storage unit 10, e.g., a scratchpad memory included in the storage unit 10. Then, a OR operation on each element of a vector is performed in a vector operation unit. Finally, a result is written back into a specified address of a scalar register file.

For the vector exponent instruction (VE), a device is configured to retrieve vector data of a specified size from a specified address of the storage unit 10, e.g., a scratchpad memory included in the storage unit 10. Then, an exponent operation on each element of a vector is performed in the vector operation unit. Finally, a result is written back into a specified address of the scratchpad memory.

For the vector logarithm instruction (VL), a device is configured to retrieve vector data of a specified size from a specified address of the storage unit 10, e.g., a scratchpad memory included in the storage unit 10. Then, a logarithm operation on each element of a vector is performed in a vector operation unit. Finally, a result is written back into a specified address of the scratchpad memory.

For the vector greater than instruction (VGT), a device is configured to respectively retrieve two blocks of vector data of a specified size from specified addresses of the storage unit 10, e.g., a scratchpad memory included in the storage unit 10. Then, in a vector operation unit, the two blocks of vector data are contrapuntally compared; a corresponding element of an output vector is set as "1" if an element of a former vector is greater than a corresponding element of a latter vector, otherwise, the corresponding element of the output vector is set as "0". Finally, a result is written back into a specified address of the scratchpad memory.

For the vector equal decision instruction (VEQ), a device is configured to respectively retrieve two blocks of vector data of a specified size from specified addresses of the storage unit 10, e.g., a scratchpad memory included in the storage unit 10. Then, in a vector operation unit, the two blocks of vector data are contrapuntally compared; a corresponding element of an output vector is set as "1" if an element of a former vector is equal to a corresponding element of a latter vector, otherwise, the corresponding element of the output vector is set as "0". Finally, a result is written back into a specified address of the scratchpad memory.

For the vector invert instruction (VINV), a device is configured to retrieve vector data of a specified size from a specified address of the storage unit 10, e.g., a scratchpad memory included in the storage unit 10. Then, a NOT operation on each element of a vector is performed. Finally, a result is written back into a specified address of the scratchpad memory.

For the vector merge instruction (VMER), a device is configured to respectively retrieve vector data of a specified size from specified addresses of the storage unit 10, e.g., a scratchpad memory included in the storage unit 10, where the vector data includes a selecting vector, a selected vector I, and a selected vector II. Then the operation unit 12, e.g., a vector operation unit included in the operation unit 12 selects a corresponding element from the selected vector I or the selected vector II as an element of an output vector, according to a value ("1" or "0") of an element of the selecting vector. Finally, a result is written back into a specified address of the scratchpad memory.

For the vector maximum instruction (VMAX), a device is configured to retrieve vector data of a specified size from a specified address of the storage unit 10, e.g., a scratchpad memory included in the storage unit 10. Then a maximum element of a vector is selected as a result. Finally, the result is written back into a specified address of a scalar register file.

For the scalar to vector instruction (STV), a device is configured to retrieve scalar data from a specified address of a scalar register file. Then, in a vector operation unit, a scalar is extended to be a vector of a specified length. Finally, a result is written back into the scalar register file. For example, a scalar may be converted to a vector, each element of the vector being a value equal to the scalar.

For the scalar to vector Pos N instruction (STVPN), a device is configured to retrieve a scalar from a specified address of a scalar register file and a vector of a specified size from a specified address of the storage unit 10, e.g., a scratchpad memory included in the storage unit 10. Then, in a vector calculation unit, an element in a specified position of the vector is replaced with a value of the scalar. Finally, a result is written back into a specified address of the scratchpad memory.

For the vector Pos N to scalar instruction (VPNTS), a device is configured to retrieve a scalar from a specified address of a scalar register file and a vector of a specified size from a specified address of the storage unit 10, e.g., a scratchpad memory included in the storage unit 10. Then, in a vector calculation unit, a value of the scalar is replaced with an element in a specified position of the vector. Finally, a result is written back into a specified address of the scalar register file.

For the vector retrieval instruction (VR), a device is configured to retrieve a vector of a specified size from a specified address of the storage unit 10, e.g., a scratchpad memory included in the storage unit 10. Then, in a vector calculation unit, an element of the vector is extracted according to a specified position to serve as an output. Finally, a result is written back into a specified address of a scalar register file.

For the vector dot product instruction (VP), a device is configured to respectively retrieve two blocks of vector data of a specified size from specified addresses of the storage unit 10, e.g., a scratchpad memory included in the storage unit 10. Then, in a vector calculation unit, a dot product operation on two vectors is performed. Finally, a result is written back into a specified address of a scalar register file.

For the random vector instruction (RV), a device is configured to generate, in a vector calculation unit, a random vector satisfying uniform distribution ranging from 0 to 1. Finally, a result is written back into a specified address of the storage unit 10, e.g., a scratchpad memory included in the storage unit 10.

For the vector cyclic shift instruction (VCS), a device is configured to retrieve a vector of a specified size from a specified address of the storage unit 10, e.g., a scratchpad memory included in the storage unit 10. Then, in a vector calculation unit, a cyclic shift operation on the vector is performed according to a specified step size. Finally, a result is written back into a specified address of the scratchpad memory.

For the vector load instruction (VLOAD), a device is configured to load vector data of a specified size from a specified external source address to a specified address of the storage unit 10, e.g., a scratchpad memory included in the storage unit 10.

For the vector storage instruction (VS), a device is configured to store vector data of a specified size from a specified address of the storage unit 10, e.g., a scratchpad memory included in the storage unit 10 into an external destination address, e.g., an external storage device to the computing device 100.

For the vector movement instruction (VMOVE), a device is configured to store (in other words, move) vector data of a specified size from a specified address of the storage unit 10, e.g., a scratchpad memory included in the storage unit 10 into another specified address of the scratchpad memory.

For the matrix-multiply-vector instruction (MMV), a device is configured to fetch matrix data and vector data of a specified size from specified addresses of the storage unit 10, e.g., a scratchpad memory included in the storage unit 10. Then a matrix is multiplied by a vector in a matrix operation unit. Finally, a result is written back into a specified address of the scratchpad memory. It should be noted that, the vector can be stored as a matrix of a specific form (i.e., a matrix with only one row of elements) in the scratchpad memory.

For the vector-multiply-matrix instruction (VMM), a device is configured to fetch vector data and matrix data of a specified length from specified addresses of the storage unit 10, e.g., a scratchpad memory included in the storage unit 10. Then a vector is multiplied by a matrix in a matrix operation unit. Finally, a result is written back into a specified address of the scratchpad memory. It should be noted that, the vector can be stored as a matrix of a specific form (i.e., a matrix with only one row of elements) in the scratchpad memory.

For the matrix-multiply-scalar instruction (VMS), a device is configured to fetch matrix data of a specified size from a specified address of the storage unit 10, e.g., a scratchpad memory included in the storage unit 10 and scalar data of a specified size from a specified address of a scalar register file. Then a scalar is multiplied by a matrix in a matrix operation unit. Finally, a result is written back into a specified address of the scratchpad memory. It should be noted that, the scalar register file stores both the scalar data and an address of the matrix.

For the tensor operation instruction (TENS), a device is configured to respectively fetch two blocks of matrix data of a specified size from two specified addresses of the storage unit 10, e.g., a scratchpad memory included in the storage unit 10. Then a tensor operation on the two blocks of matrix data is performed in a matrix operation unit. Finally, a result is written back into a specified address of the scratchpad memory.

For the matrix addition instruction (MA), a device is configured to respectively fetch two blocks of matrix data of a specified size from two specified addresses of the storage unit 10, e.g., a scratchpad memory included in the storage unit 10. Then an addition operation on two matrices is performed in a matrix operation unit. Finally, a result is written back into a specified address of the scratchpad memory.

For the matrix subtraction instruction (MS), a device is configured to respectively fetch two blocks of matrix data of a specified size from two specified addresses of the storage unit 10, e.g., a scratchpad memory included in the storage unit 10. Then a subtraction operation on two matrices is performed in a matrix operation unit. Finally, a result is written back into a specified address of the scratchpad memory.

For the matrix retrieval instruction (MR), a device is configured to fetch vector data of a specified size from a specified address of the storage unit 10, e.g., a scratchpad memory included in the storage unit 10 and matrix data of a specified size from a specified address of the scratchpad memory, where, in a matrix operation unit, the vector is an index vector, and an ith element of an output vector is an element found in the ith column of the matrix by using an ith element of the index vector as an index. Finally, the output vector is written back into a specified address of the scratchpad memory.

For the matrix load instruction (ML), a device is configured to load data of a specified size from a specified external source address to a specified address of the storage unit 10, e.g., a scratchpad memory included in the storage unit 10.

For the matrix storage instruction (MS), a device is configured to store matrix data of a specified size from a specified address of the storage unit 10, e.g., a scratchpad memory included in the storage unit 10 into an external destination address.

For the matrix movement instruction (MMOVE), a device is configured to store (in other words, move) matrix data of a specified size from a specified address of the storage unit 10, e.g., a scratchpad memory included in the storage unit 10 into another specified address of the scratchpad memory.

The scratchpad memory mentioned above is merely an example, which is a representation of a storage unit. It should be understood that, the above instructions can also use other storage units. Storage unit of the above instructions is not limited in embodiments of the present disclosure.

As an example, the structure of n-stage pipeline mentioned above can be a structure of two-stage pipeline. The structure of two-stage pipeline is configured to execute the first calculation instruction, where the first calculation instruction can be a matrix and scalar calculation instruction. The matrix and scalar calculation instruction includes, but is not limited to, a vector-add-scalar instruction (VAS), a scalar-subtract-vector instruction (SSV), a vector-multiply-scalar instruction (VMS), a scalar-divide-vector instruction (SDV), a matrix-add-scalar instruction, a scalar-subtract-matrix instruction, a matrix-multiply-scalar instruction, a scalar-divide-matrix instruction, a vector addition instruction (VA), a matrix addition instruction (VA), a matrix-multiply-scalar instruction (VMS), a matrix addition instruction (MA), and a matrix subtraction instruction (MS). The foregoing instructions can be executed by adopting a structure illustrated in FIG. 1B, in this case, the third stage pipeline 206 can be deleted or perform a null operation (i.e., the third stage pipeline 206 has output data the same as input data).

When the first calculation instruction is the matrix and scalar calculation instruction, the controller unit 11 is configured to: extract the matrix and scalar calculation instruction from the storage unit 10, obtain a first operation code and a first operation field of the matrix and scalar calculation instruction by parsing the matrix and scalar calculation instruction, extract input data and weight data corresponding to the first operation field, and send the first operation code as well as the input data and the weight data corresponding to the first operation field to the operation unit 12.

The operation unit 12 includes a structure of two-stage pipeline, with this structure, an operation module in a structure of a first stage pipeline 202 of the operation unit 12 is configured to obtain an intermediate result by performing an arithmetic operation corresponding to the first operation code on the input data and the weight data; an operation module in a structure of a second stage pipeline 204 of the operation unit 12 is configured to obtain the result of the first calculation instruction by performing a subsequent operation on the intermediate result.

The subsequent operation can be a null operation, that is, the operation module in the structure of the second stage pipeline 204 obtains the result of the first calculation instruction by outputting the intermediate result. It should be noted that, the structure of the two-stage pipeline mentioned above can be replaced with a structure of three-stage pipeline. As one implementation, an operation module of a structure of a first stage pipeline 202 in the structure of three-stage pipeline has the same performing manner as that of an operation module of the structure of two-stage pipeline; likewise, an operation module of a structure of a second stage pipeline 204 in the structure of three-stage pipeline outputs an intermediate result to an operation module of a structure of a third stage pipeline 206 in the structure of three-stage pipeline, and the operation module of the structure of the third stage pipeline 206 outputs the intermediate result to obtain the result of the first calculation instruction.

As another example, the structure of n-stage pipeline, as mentioned above, can be a structure of three-stage pipeline. The structure of three-stage pipeline is configured to execute the first calculation instruction, and the first calculation instruction can be a multiplication instruction. The multiplication instruction includes, but is not limited to, a vector-multiply-vector instruction (VMV), a matrix-multiply-matrix multiplication instruction, a matrix-multiply-vector instruction (MMV), and a vector-multiply-matrix instruction (VMM).

When the first calculation instruction is the multiplication instruction, the controller unit 11 is configured to: extract the multiplication instruction from the storage unit 10, obtain a first operation code and a first operation field of the multiplication instruction by parsing the multiplication instruction, extract input data and weight data corresponding to the first operation field, and send the first operation code as well as the input data and the weight data corresponding to the first operation field to the operation unit 12.

The operation unit 12 includes a plurality of operation modules. An operation module in a structure of a first stage pipeline 202 of the operation unit 12 is configured to obtain a multiplication result by performing a multiplication operation on the input data and the weight data received. An operation module in a structure of a second stage pipeline 204 of the operation unit 12 is configured to obtain an intermediate result by performing an addition operation on the multiplication result sent to the operation module in the structure of the second stage pipeline 204, and to send the intermediate result to an operation module in a structure of a third stage pipeline 206. The operation module in the structure of the third stage pipeline 206 is configured to obtain a result of the multiplication instruction by stitching and combining the intermediate result. In an implementation, the result of the multiplication instruction obtained is a result matrix and the intermediate result is data in each column, a manner of the stitching and combining the intermediate result includes, but is not limited to, a manner where the result matrix is obtained by putting each intermediate result into a column of the result matrix.

As yet another example, the structure of n-stage pipeline mentioned above can be a structure of three-stage pipeline. The structure of three-stage pipeline is configured to execute the first calculation instruction, and the first calculation instruction can be a division instruction. The division instruction includes, but is not limited to, a vector division instruction (VD) and a matrix division instruction. The structure of n-stage pipeline is a structure of three-stage pipeline.

When the first calculation instruction is the division instruction, the controller unit 11 is configured to: extract the division instruction from the storage unit 10, obtain a first operation code and a first operation field of the division instruction by parsing the division instruction, extract input data and weight data corresponding to the first operation field, and send the first operation code as well as the input data and the weight data corresponding to the first operation field to the operation unit 12.

The operation unit 12 includes a plurality of operation modules, and the plurality of operation modules form a three-stage pipeline. An operation module in a structure of a first stage pipeline 202 is configured to obtain inverse weight data by performing an inversion on the weight data, and to send the input data and the inverse weight data to an operation module in a structure of a second stage pipeline 204. The operation module in the structure of the second stage pipeline 204 is configured to obtain an intermediate result by performing an inner product operation on the input data and the inverse weight data, and to send the intermediate result to an operation module in a structure of a third stage pipeline 206. The operation module in the structure of the third stage pipeline 206 is configured to obtain a result of the division instruction by stitching and combining the intermediate result.

The present disclosure further provides a machine learning computing method. The machine learning computing method can be applied to the above-mentioned computing device. For structure and technical solution of the above-mentioned computing device, reference may be made to the description of embodiments illustrated in FIG. 1A, and the disclosure will not be described in further detail herein. In the following, take a neural network operation instruction as an example for describing a computing method of the computing device illustrated in FIG. 1A. For a neural network operation instruction, a formula to be executed can be expressed as s=s(A*B+b). In other words, a bias b is added to a result of multiplying an input matrix A by a weight matrix B, to perform an activation operation s(h) to obtain a final output result s.

The method for executing the neural network operation instruction through the computing device illustrated in FIG. 1A may include the following actions.

The controller unit 11 extracts a neural network calculation instruction from the instruction cache unit 110, obtains a first operation code and a first operation field of the neural network calculation instruction by parsing the neural network calculation instruction, extracts, from the storage unit 10, an input matrix A and a weight matrix B corresponding to the first operation field, and sends the first operation code as well as the input matrix A and the weight matrix B corresponding to the first operation field to the operation unit 12.

The operation unit 12 can include a structure of three-stage pipeline. A first stage pipeline 202 includes multipliers, a second stage pipeline 204 includes a sorting operator, and a third stage pipeline 206 includes an adder and an activation operator. The operation unit 12 splits the input matrix A into a plurality of sub-matrices Ax (where x represents number of the plurality of sub-matrices), distributes the plurality of sub-matrices Ax to a plurality of multipliers of the first stage pipeline 202, and broadcasts the weight matrix B to the plurality of multipliers of the first stage pipeline 202.

Each multiplier performs a matrix-multiply-matrix operation on the sub-matrices Ax and the weight matrix B to obtain an intermediate result, and then all intermediate results obtained are sent to the sorting operator of the second stage pipeline 204. The sorting operator sorts all the intermediate results according to number of the sub-matrices Ax to obtain a sorted result, and sends the sorted result to the adder of the third stage pipeline 206. The adder performs an operation of the bias b on the sorted result to obtain a result added a bias. The activation operator performs an activation operation S(h) on the result added the bias to obtain an output result, and stores the output result to the storage unit 10.

Technical solution provided by the present disclosure can realize a matrix-multiply-matrix operation by adopting a structure of n-stage pipeline (for example, n is equal to 3, 2, or the like). During the entire operation process, data only needs to be extracted from the storage unit once and does not need to be extracted again under a structure of three-stage pipeline. In this case, the number of data extractions can be reduced and efficiency of data extraction can be improved. In addition, the structure of three-stage pipeline does not need to cache data when performing intermediate operations, which can greatly reduce intermediate cache, thus reducing the intermediate cache and cost. Meanwhile, most multiplication operations are assigned to multiple multipliers, it is possible to save computation time and reduce power consumption of computation.

The present disclosure further provides a machine learning operation device including at least one computing device mentioned in the present disclosure. The machine learning operation device is configured to acquire data to be operated and control information from other processing devices, to perform a specified machine learning operation, and to send a result of performing the specified machine learning operation to peripheral devices through an input/output (I/O) interface. For example, the peripheral device can be a camera, a display, a mouse, a keyboard, a network card, a wireless-fidelity (Wi-Fi) interface, a server, and so on. When at least two computing devices are included, the at least two computing devices are configured to connect with each other and to transmit data through a specific structure. In an implementation, the at least two computing devices are configured to interconnect with each other and to transmit data via a fast peripheral component interconnect express (PCIE) bus, to support larger-scale machine learning operations. At this point, the at least two computing devices share a same control system or have their own control systems, and share a memory or have their own memories. In addition, the at least two computing devices have an interconnection mode of an arbitrary interconnection topology.

The machine learning operation device has high compatibility and can be connected with various types of servers through the PCIE interface.

Figure 2:
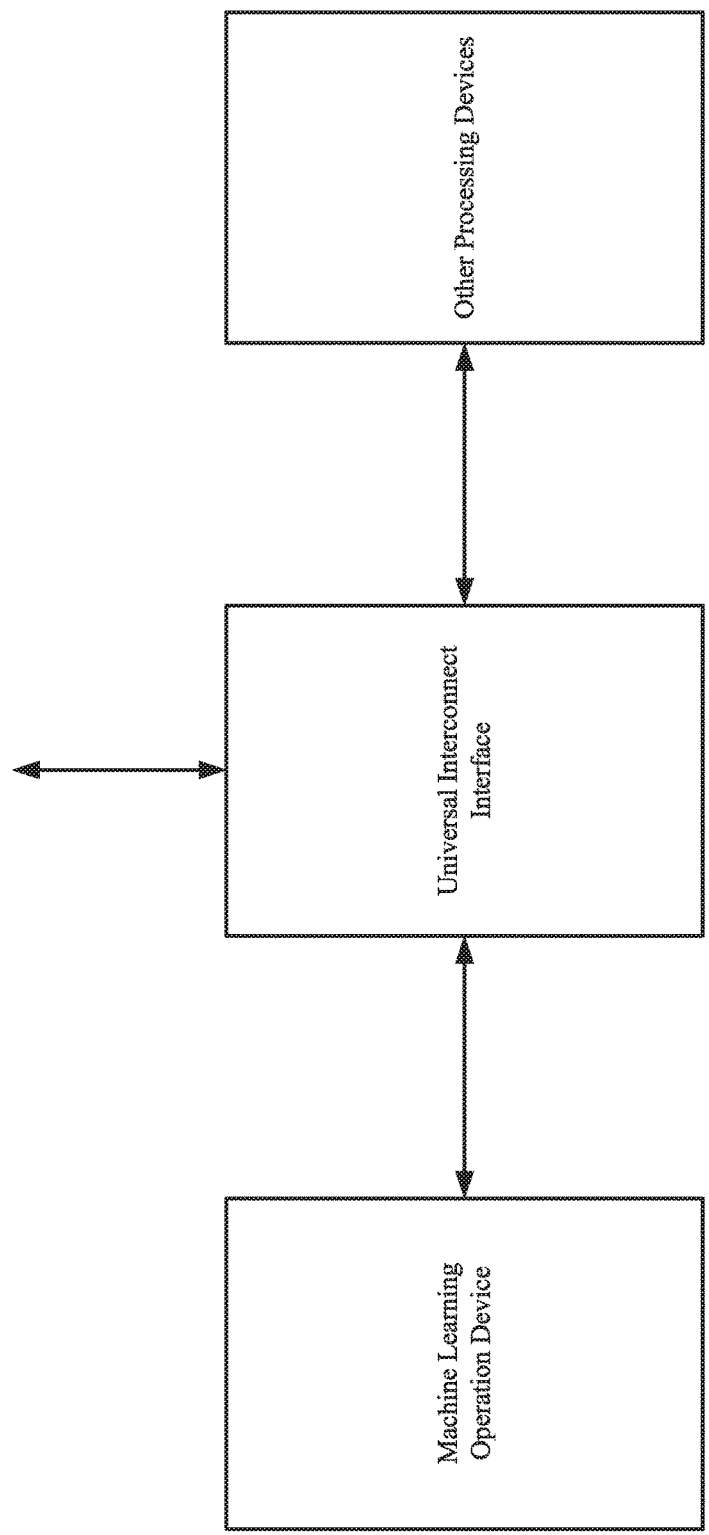
FIG. 2 is a structural diagram illustrating a combined processing device according to an embodiment of the present disclosure.

The present disclosure further provides a combined processing device. The combined processing device includes the machine learning operation device mentioned above, a universal interconnect interface, and other processing devices. The machine learning operation device is configured to interact with other processing devices to complete a user-specified computing operation. FIG. 2 is a schematic diagram of a combined processing device.

Other processing devices can include one or more of general-purpose processors and special-purpose processors, such as a central processing unit (CPU), a graphics processing unit (GPU), a machine learning processing unit, and other types of processors. It should be noted that, the number of processors included in other processing devices is not limited herein. Other processing devices serve as interfaces of the machine learning computing device for controlling external data, for example, data transfer, and complete basic control such as opening and stopping of the machine learning computing device. Other processing devices can also cooperate with the machine learning computing device to complete a computing task.

The universal interconnect interface is configured to transmit data and control commands between the machine learning operation device and other processing devices. The machine learning operation device is configured to acquire required input data from other processing devices, and to write the input data acquired to a storage device of a slice of the machine learning operation device. The machine learning operation device can be configured to acquire the control commands from other processing devices and to write the control commands acquired to a control cache of the slice of the machine learning operation device. Data of a storage module of the machine learning operation device can be read and transmitted to other processing devices.

Figure 3:
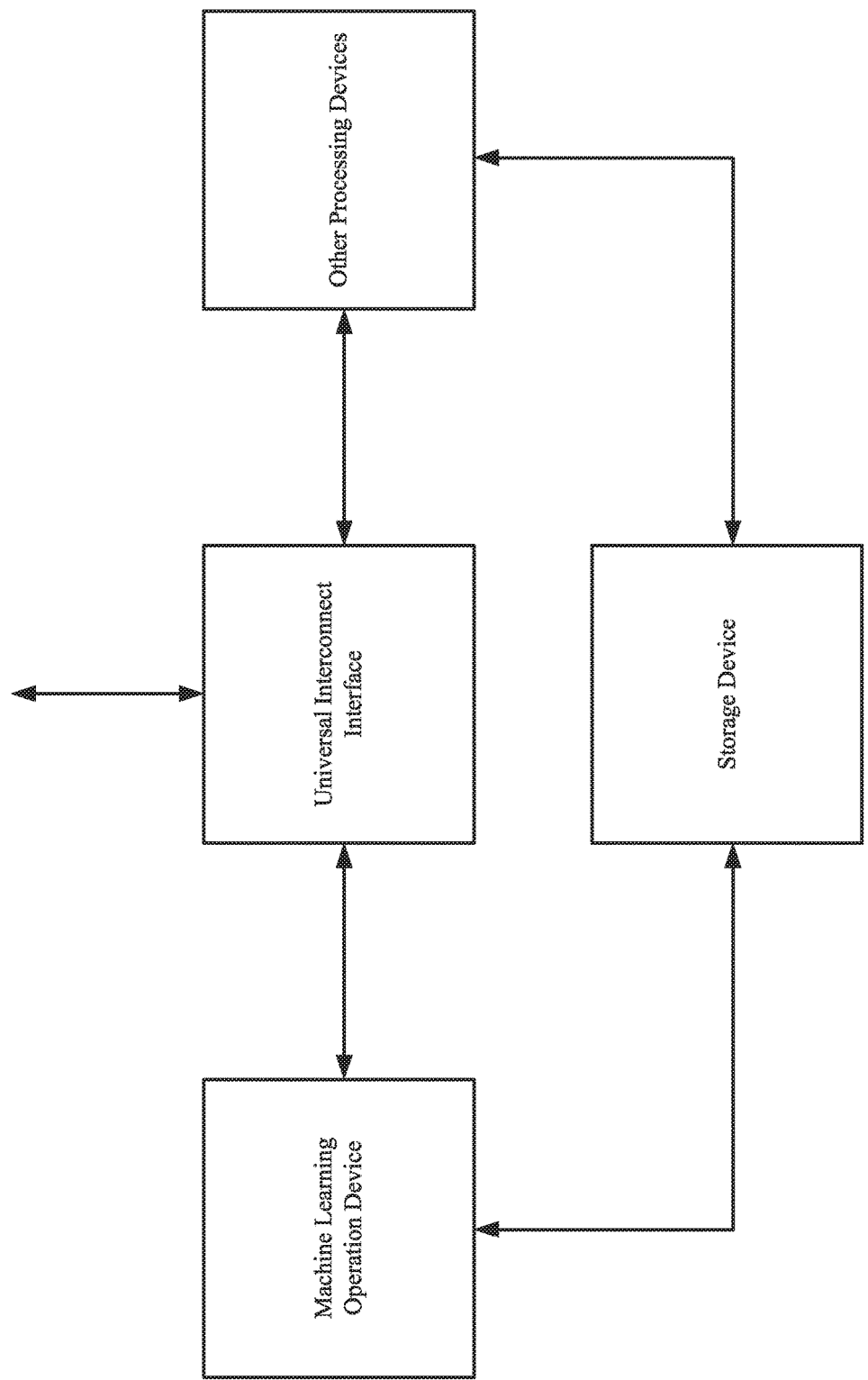
FIG. 3 is a structural diagram illustrating another combined processing device according to an embodiment of the present disclosure.

As one implementation, as illustrated in FIG. 3, the combined processing device further includes a storage device. The storage device is connected with the machine learning operation device and other processing devices. The storage device is configured to store data of the machine learning operation device and other processing devices, and particularly suitable for storing data that is to be calculated and cannot be completely saved in internal storage of the machine learning operation device or other processing devices.

The combined processing device can serve as a system on a chip (SOC) of a device, where the device can be a mobile phone, a robot, a drone, a video monitoring device, or the like. It is possible to effectively reduce core area of a control part, increase processing speed, and reduce overall power consumption. In this case, the universal interconnect interface of the combined processing device is coupled to certain components of the device, and the certain components include, but are not limited to, cameras, displays, mouse, keyboards, network cards, and wifi interfaces.

In some implementations, the present disclosure provides a chip. The chip includes the machine learning operation device or the combined processing device.

In some implementations, the present disclosure provides a chip packaging structure. The chip packaging structure includes the chip mentioned above.

In some implementations, the present disclosure provides a board. The board includes the chip packaging structure mentioned above.

In some implementations, the present disclosure provides an electronic equipment. The electronic equipment includes the board mentioned above.

The electronic equipment can be a data processing device, a robot, a computer, a printer, a scanner, a tablet, a smart terminal, a mobile phone, a driving recorder, a navigator, a sensor, a webcam, a server, a cloud server, a camera, a video camera, a projector, a watch, headphones, mobile storage, a wearable device, a vehicle, a home appliance, and/or a medical equipment.

The vehicle includes, but is not limited to, an airplane, a ship, and/or a car. The home appliance includes, but is not limited to, a TV, an air conditioner, a microwave oven, a refrigerator, an electric cooker, a humidifier, a washing machine, an electric lamp, a gas stove, and a hood. The medical equipment includes, but is not limited to, a nuclear magnetic resonance spectrometer, a B-ultrasonic and/or an electrocardiograph.

It is to be noted that, for the sake of simplicity, the foregoing method embodiments are described as a series of action combinations, however, it will be appreciated by those skilled in the art that the present disclosure is not limited by the sequence of actions described. That is because that, according to the present disclosure, certain steps or operations may be performed in other order or simultaneously. Besides, it will be appreciated by those skilled in the art that the embodiments described in the specification are exemplary embodiments and the actions and modules involved are not necessarily essential to the present disclosure.

In the foregoing embodiments, the description of each embodiment has its own emphasis. For the parts not described in detail in one embodiment, reference may be made to related descriptions in other embodiments.

In the embodiments of the disclosure, it should be understood that, the apparatus disclosed in embodiments provided herein may be implemented in other manners. For example, the device/apparatus embodiments described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. Part or all of the units may be selected according to actual needs to achieve the purpose of the technical solutions of the embodiments.

In addition, the functional units in various embodiments of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the operations described in the various embodiments of the present disclosure. The memory includes various medium capable of storing program codes, such as a universal serial bus (USB), a read-only memory (ROM), a random access memory (RAM), a removable hard disk, Disk, compact disc (CD), or the like.

It will be understood by those of ordinary skill in the art that all or a part of the various methods of the embodiments described above may be accomplished by means of a program to instruct associated hardware, the program may be stored in a computer-readable memory, which may include a flash memory, a read-only memory (ROM), a random access memory (RAM), Disk or compact disc (CD), and so on.

While the present disclosure has been described in detail above with reference to the exemplary embodiments, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A computing device, configured to perform machine learning calculations, comprising:
   a storage unit that includes a data input/output (I/O) unit and one or any combination of a register and a cache;
   a data I/O unit configured to acquire data, a machine learning model, and calculation instructions, wherein the storage unit is configured to store the machine learning model and the data; and
   a controller unit configured to extract a first calculation instruction from the storage unit, to obtain an operation code and an operation field of the first calculation instruction by parsing the first calculation instruction, to extract data corresponding to the operation field, and to send the operation code and the data corresponding to the operation field to the operation unit;
   wherein the operation field includes at least a register number that identifies the register or an immediate value;

wherein the operation code is an operation code of a matrix calculation instruction; and wherein the operation unit is configured to obtain a result of the first calculation instruction by performing an operation corresponding to the operation code on the data corresponding to the operation field, according to the operation code.

2. The device of claim 1, wherein the acquired data includes input data, weight data, and output data.

3. The device of claim 2, wherein the operation unit comprises:

a plurality of operation modules, configured to form a structure of n-stage pipeline and to perform calculations of the n-stage pipeline; and the operation unit is configured to:

obtain a first result by performing a calculation of a first stage pipeline on the input data and the weight data;

obtain a second result by performing a calculation of a second stage pipeline on the first result input in the second stage pipeline;

obtain a $n^{th}$ result by performing a calculation of a $n^{th}$ stage pipeline on a $(n-1)^{th}$ result input in the $n^{th}$ stage pipeline; and input the $n^{th}$ result to the storage unit; wherein n is an integer greater than or equal to 2.

4. The device of claim 3, wherein the operation unit comprises a structure of two-stage pipeline, and the first calculation instruction executed comprises a matrix and scalar calculation instruction;

wherein the matrix and scalar calculation instruction comprises:

a vector-add-scalar instruction (VAS), a scalar-subtract-vector instruction (SSV), a vector-multiply-scalar instruction (VMS), a scalar-divide-vector instruction (SDV), a matrix-add-scalar instruction, a scalar-subtract-matrix instruction, a matrix-multiply-scalar instruction, a scalar-divide-matrix instruction, a vector addition instruction (VA) or a vector addition instruction (VA), a matrix addition instruction (MA), a matrix-multiply-scalar instruction (VMS), a matrix addition instruction (MA), and a matrix subtraction instruction (MS);

wherein the controller unit is configured to:

extract the matrix and scalar calculation instruction from the storage unit;

obtain a first operation code and a first operation field of the matrix and scalar calculation instruction by parsing the matrix and scalar calculation instruction;

extract input data and weight data corresponding to the first operation field; and send the first operation code as well as the input data and the weight data corresponding to the first operation field to the operation unit;

wherein an operation module in a structure of a first stage pipeline of the operation unit is configured to obtain an intermediate result by performing an operation corresponding to the first operation code on the input data and the weight data; and wherein an operation module in a structure of a second stage pipeline of the operation unit is configured to obtain the result of the first calculation instruction by performing a subsequent operation on the intermediate result.

5. The device of claim 3, wherein the operation unit comprises a structure of three-stage pipeline, and the first calculation instruction executed comprises a multiplication instruction;

wherein the multiplication instruction comprises:

a vector-multiply-vector instruction (VMV), a matrix-multiply-matrix instruction, a matrix-multiply-vector instruction (MMV), and a vector-multiply-matrix instruction (VMM);

wherein the controller unit is configured to:

extract the multiplication instruction from the storage unit;

obtain a first operation code and a first operation field of the multiplication instruction by parsing the multiplication instruction;

extract input data and weight data corresponding to the first operation field; and send the first operation code as well as the input data and the weight data corresponding to the first operation field to the operation unit;

wherein an operation module in a structure of a first stage pipeline of the operation unit is configured to obtain a multiplication result by performing a multiplication operation on the input data and the weight data received;

wherein an operation module in a structure of a second stage pipeline of the operation unit is configured to:

obtain an intermediate result by performing an addition operation on the multiplication result sent to the operation module in the structure of the second stage pipeline; and send the intermediate result to an operation module in a structure of a third stage pipeline; and wherein the operation module in the structure of the third stage pipeline is configured to obtain a result of the multiplication instruction by stitching and combining the intermediate result.

6. The device of claim 3, wherein the operation unit comprises a structure of three-stage pipeline, and the first calculation instruction executed comprises a division instruction;

wherein the division instruction comprises a vector division instruction (VD) and a matrix division instruction;

wherein the controller unit is configured to:

extract the division instruction from the storage unit;

obtain a first operation code and a first operation field of the division instruction by parsing the division instruction;

extract input data and weight data corresponding to the first operation field; and send the first operation code as well as the input data and the weight data corresponding to the first operation field to the operation unit;

wherein an operation module in a structure of a first stage pipeline is configured to:

obtain inverse weight data by performing an inversion on the weight data; and send the input data and the inverse weight data to an operation module in a structure of a second stage pipeline;

wherein the operation module in the structure of the second stage pipeline is configured to:

obtain an intermediate result by performing an inner product operation on the input data and the inverse weight data; and send the intermediate result to an operation module in a structure of a third stage pipeline; and wherein the operation module in the structure of the third stage pipeline is configured to obtain a result of the division instruction by stitching and combining the intermediate result.

7. The device of claim 1, wherein the controller unit comprises:
an instruction cache unit configured to cache the first calculation instruction;
an instruction processing unit configured to obtain the operation code and the operation field of the first calculation instruction by parsing the first calculation instruction; and
a storage queue unit configured to store an instruction queue, wherein the instruction queue includes one or more calculation instructions or operation codes to be executed arranged in a sequence of the instruction queue.

8. The device of claim 7, wherein the controller unit further comprises
a dependency relationship processing unit configured to:
determine whether there is an associated relationship between the first calculation instruction and a zeroth calculation instruction stored prior to the first calculation instruction;
cache the first calculation instruction to the instruction cache unit, based on a determination that there is the associated relationship between the first calculation instruction and the zeroth calculation instruction; and
transmit the first calculation instruction extracted from the instruction cache unit to the operation unit after execution of the zeroth calculation instruction is completed;
the dependency relationship processing unit configured to determine whether there is the associated relationship between the first calculation instruction and the zeroth calculation instruction prior to the first calculation instruction is configured to:
extract a first storage address space of the operation field of the first calculation instruction, according to the first calculation instruction;
extract a zeroth storage address space of an operation field of the zeroth calculation instruction, according to the zeroth calculation instruction; and
determine there is the associated relationship between the first calculation instruction and the zeroth calculation instruction when there is an overlapping area of the first storage address space and the zeroth storage address space; or
determine there is no associated relationship between the first calculation instruction and the zeroth calculation instruction when there is no overlapping area of the first storage address space and the zeroth storage address space.

9. The device of claim 1, wherein the matrix calculation instruction comprises one or any combination of:
a vector AND vector instruction (VAV), a vector AND instruction (VAND), a vector OR vector instruction (VOV), a vector OR instruction (VOR), a vector exponent instruction (VE), a vector logarithm instruction (VL), a vector greater than instruction (VGT), a vector equal decision instruction (VEQ), a vector invert instruction (VINV), a vector merge instruction (VMER), a vector maximum instruction (VMAX), a scalar to vector instruction (STV), a scalar to vector Pos N instruction (STVPN), a vector Pos N to scalar instruction (VPNTS), a vector retrieval instruction (VR), a vector dot product instruction (VP), a random vector instruction (RV), a vector cyclic shift instruction (VCS), a vector load instruction (VLOAD), a vector storage instruction (VS), a vector movement instruction (VMOVE), a matrix retrieval instruction (MR), a matrix load instruction (ML), a matrix storage instruction (MS), and a matrix movement instruction (MMOVE).

10. A machine learning operation device, comprising at least one computing device of claim 1, wherein
the machine learning operation device is configured to acquire data to be operated and control information from other processing devices, to perform a specified machine learning operation, and to send a result of performing the specified machine learning operation to other processing devices through an input/output (I/O) interface;
at least two computing devices are configured to connect with each other and to transmit data through a specific structure when the machine learning operation device comprises the at least two computing devices;
the at least two computing devices are configured to interconnect with each other and to transmit data via a peripheral component interconnect express (PCIE) bus to support larger-scale machine learning operations; and
the at least two computing devices share a same control system or have their own control systems, share a memory or have their own memories, and have an interconnection mode of an arbitrary interconnection topology.

11. A machine learning computing method, applicable to a computing device, the computing device comprising an operation unit, a controller unit, and a storage unit;
wherein the storage unit comprises a data input/output (I/O) unit and one or any combination of a register and a cache;
acquiring, by the data I/O unit, data, a machine learning model, and calculation instructions, wherein the storage unit is configured to store the machine learning model and the data;
extracting, by the controller unit, a first calculation instruction from the storage unit, obtaining, by the controller unit, an operation code and an operation field of the first calculation instruction by parsing the first calculation instruction, extracting, by the controller unit, data corresponding to the operation field, and sending, by the controller unit, the operation code and the data corresponding to the operation field to the operation unit;
wherein the operation field includes at least a register number that identifies the register or an immediate value;
wherein the operation code is an operation code of a matrix calculation instruction; and
obtaining, by the operation unit, a result of the first calculation instruction by performing an operation corresponding to the operation code on the data corresponding to the operation field, according to the operation code.

12. The method of claim 11, wherein the acquired data comprises input data, weight data, and output data.

13. The method of claim 12, wherein
the operation unit comprises:
a plurality of operation modules, configured to form a structure of n-stage pipeline and to perform calculations of the n-stage pipeline; and
the operation unit is configured to:
obtain a first result by performing a calculation of a first stage pipeline on the input data and the weight data;

obtain a second result by performing a calculation of a second stage pipeline on the first result input in the second stage pipeline;

obtain a $n^{th}$ result by performing a calculation of a $n^{th}$ stage pipeline on a $(n-1)^{th}$ result input in the $n^{th}$ stage pipeline; and input the $n^{th}$ result to the storage unit; wherein n is an integer greater than or equal to 2.

14. The method of claim 13, wherein the operation unit comprises a structure of two-stage pipeline, and executing the first calculation instruction comprises:

executing a matrix and scalar calculation instruction;

wherein the matrix and scalar calculation instruction comprises:

a vector-add-scalar instruction (VAS), a scalar-subtract-vector instruction (SSV), a vector-multiply-scalar instruction (VMS), a scalar-divide-vector instruction (SDV), a matrix-add-scalar instruction, a scalar-subtract-matrix instruction, a matrix-multiply-scalar instruction, a scalar-divide-matrix instruction, a vector addition instruction (VA), a matrix addition instruction (MA), a matrix-multiply-scalar instruction (MMS), a matrix addition instruction (MA), and a matrix subtraction instruction (MS);

extracting, by the controller unit, the matrix and scalar calculation instruction from the storage unit;

obtaining, by the controller unit, a first operation code and a first operation field of the matrix and scalar calculation instruction by parsing the matrix and scalar calculation instruction;

extracting, by the controller unit, input data and weight data corresponding to the first operation field;

sending, by the controller unit, the first operation code as well as the input data and the weight data corresponding to the first operation field to the operation unit;

obtaining, by an operation module in a structure of a first stage pipeline of the operation unit, an intermediate result by performing an operation corresponding to the first operation code on the input data and the weight data; and obtaining, by an operation module in a structure of a second stage pipeline of the operation unit, the result of the first calculation instruction by performing a subsequent operation on the intermediate result.

15. The method of claim 13, wherein the operation unit comprises a structure of three-stage pipeline, and executing the first calculation instruction comprises:

executing a multiplication instruction;

wherein the multiplication instruction comprises:

a vector-multiply-vector instruction (VMV), a matrix-multiply-matrix instruction, a matrix-multiply-vector instruction (MMV), and a vector-multiply-matrix instruction (VMM);

extracting, by the controller unit, the multiplication instruction from the storage unit;

obtaining, by the controller unit, a first operation code and a first operation field of the multiplication instruction by parsing the multiplication instruction;

extracting, by the controller unit, input data and weight data corresponding to the first operation field;

sending, by the controller unit, the first operation code as well as the input data and the weight data corresponding to the first operation field to the operation unit;

obtaining, by an operation module in a structure of a first stage pipeline of the operation unit, a multiplication result by performing a multiplication operation on the input data and the weight data received;

obtaining, by an operation module in a structure of a second stage pipeline of the operation unit, an intermediate result by performing an addition operation on the multiplication result sent to the operation module in the structure of the second stage pipeline;

sending, by the operation module in the structure of the second stage pipeline of the operation unit, the intermediate result to an operation module in a structure of a third stage pipeline; and obtaining, by the operation module in the structure of the third stage pipeline, a result of the multiplication instruction by stitching and combining the intermediate result.

16. The method of claim 13, wherein the operation unit comprises a structure of three-stage pipeline, and executing the first calculation instruction comprises:

executing a division instruction;

wherein the division instruction comprises a vector division instruction (VD) and a matrix division instruction;

extracting, by the controller unit, the division instruction from the storage unit;

obtaining, by the controller unit, a first operation code and a first operation field of the division instruction by parsing the division instruction;

extracting, by the controller unit, input data and weight data corresponding to the first operation field;

sending, by the controller unit, the first operation code as well as the input data and the weight data corresponding to the first operation field to the operation unit;

obtaining, by an operation module in a structure of a first stage pipeline, inverse weight data by performing an inversion on the weight data;

sending, by the operation module in the structure of the first stage pipeline, the input data and the inverse weight data to an operation module in a structure of a second stage pipeline;

obtaining, by the operation module in the structure of the second stage pipeline, an intermediate result by performing an inner product operation on the input data and the inverse weight data;

sending, by the operation module in the structure of the second stage pipeline, the intermediate result to an operation module in a structure of a third stage pipeline; and obtaining, by the operation module in the structure of the third stage pipeline, a result of the division instruction by stitching and combining the intermediate result.

17. The method of claim 11, wherein the controller unit comprises:

an instruction cache unit, configured to cache the first calculation instruction;

an instruction processing unit, configured to obtain the operation code and the operation field of the first calculation instruction by parsing the first calculation instruction; and a storage queue unit, configured to store an instruction queue, wherein the instruction queue comprises a plurality of calculation instructions or operation codes to be executed arranged in a sequence of the instruction queue.

18. The method of claim 17, wherein the controller unit further comprises a dependency relationship processing unit, configured to:

determine whether there is an associated relationship between the first calculation instruction and a zeroth calculation instruction prior to the first calculation instruction;

cache the first calculation instruction to the instruction cache unit, based on a determination that there is the associated relationship between the first calculation instruction and the zeroth calculation instruction; and transmit the first calculation instruction extracted from the instruction cache unit to the operation unit after execution of the zeroth calculation instruction is completed;

determining whether there is the associated relationship between the first calculation instruction and the zeroth calculation instruction prior to the first calculation instruction comprises:

extracting a first storage address space of the operation field of the first calculation instruction, according to the first calculation instruction;

extracting a zeroth storage address space of an operation field of the zeroth calculation instruction, according to the zeroth calculation instruction; and determining there is the associated relationship between the first calculation instruction and the zeroth calculation instruction when there is an overlapping area of the first storage address space and the zeroth storage address space; or determining there is no associated relationship between the first calculation instruction and the zeroth calculation instruction when there is no overlapping area of the first storage address space and the zeroth storage address space.

19. The method of claim 11, wherein the matrix calculation instruction comprises one or any combination of:

a vector AND vector instruction (VAV), a vector AND instruction (VAND), a vector OR vector instruction (VOV), a vector OR instruction (VOR), a vector exponent instruction (VE), a vector logarithm instruction (VL), a vector greater than instruction (VGT), a vector equal decision instruction (VEQ), a vector invert instruction (VINV), a vector merge instruction (VMER), a vector maximum instruction (VMAX), a scalar to vector instruction (STV), a scalar to vector Pos N instruction (STVPN), a vector Pos N to scalar instruction (VPNTS), a vector retrieval instruction (VR), a vector dot product instruction (VP), a random vector instruction (RV), a vector cyclic shift instruction (VCS), a vector load instruction (VLOAD), a vector storage instruction (VS), a vector movement instruction (VMOVE), a matrix retrieval instruction (MR), a matrix load instruction (ML), a matrix storage instruction (MS), and a matrix movement instruction (MMOVE).

* * * * *